March 14, 1939. H. C. HILL 2,150,548
CONNECTING ROD
Filed May 27, 1937 2 Sheets—Sheet 2
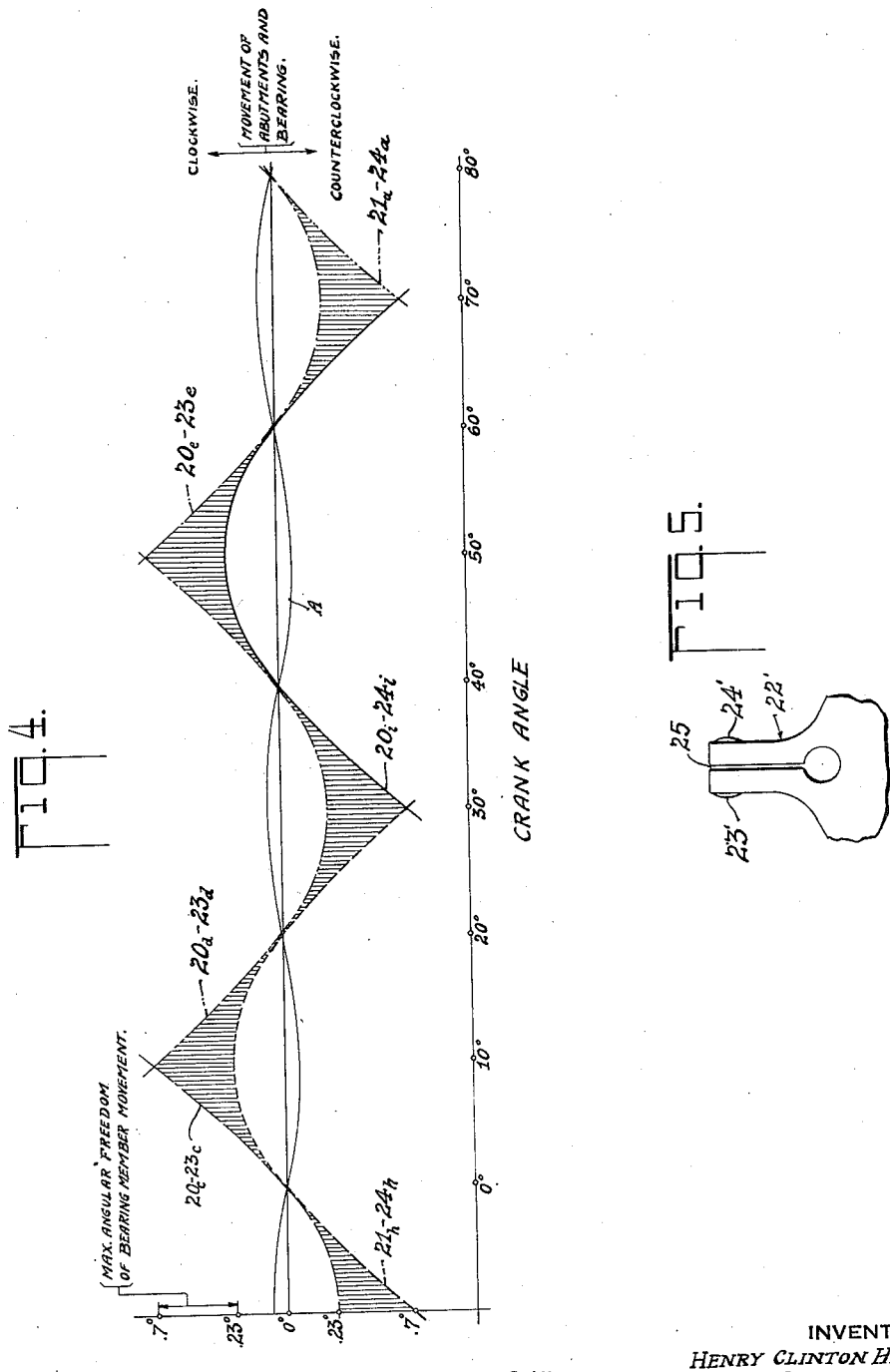
INVENTOR
HENRY CLINTON HILL
BY
ATTORNEY Patented Mar. 14, 1939

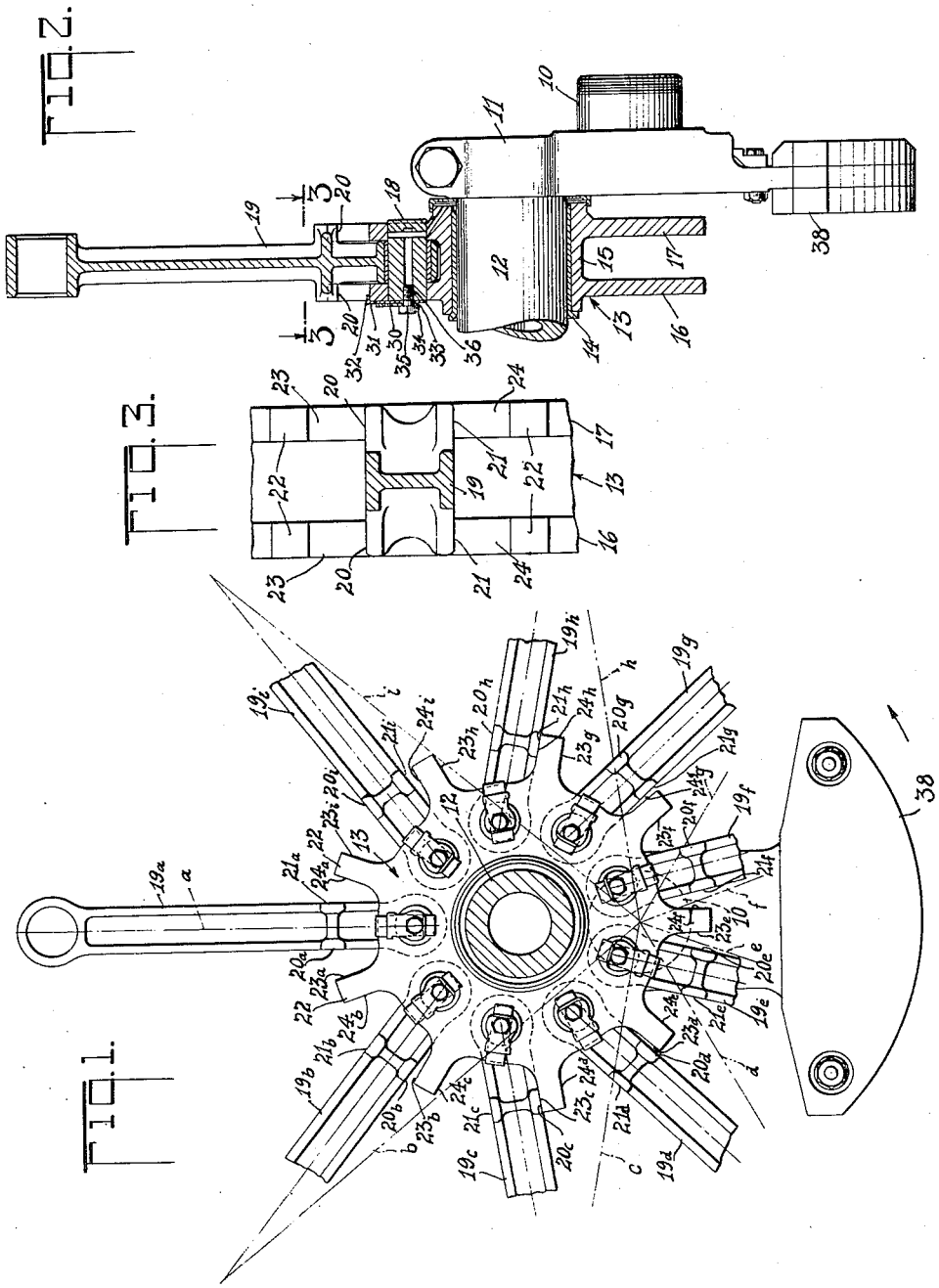

2,150,548

UNITED STATES PATENT OFFICE 2,150,548

CONNECTING ROD

Henry C. Hill, Paterson, N. J., assignor to Wright Aeronautical Corporation, a corporation of New York Application May 27, 1937, Serial No. 144,985

5 Claims. (Cl. 74—580)

This invention relates to improvements in connecting rod systems for radial cylinder engines.

An object of the invention is to provide a rod system which more closely approaches a so-called "true motion" rod system, than may be approached by the conventional master rod and articulated rod arrangement.

A further object of the invention is to provide a rod system wherein the rod motion and piston travel for pistons connected to the rods is the same for all rods and pistons of the assembly.

A further object is to provide a system wherein each connecting rod, at certain intervals during the rotation of the crankpin, functions as a master connecting rod.

Still another object is to provide a rod system wherein all of the connecting rods are pivoted to and oscillatable with respect to a bearing member embracing the crankpin, and to so organize the system that said bearing member is constrained to an orbital path with the crankpin with substantially no rotation.

Still another object is to provide a rod system wherein a bearing member, to which a plurality of connecting rods are articulated, is endowed with properties of damping, in some degree, torque reaction of the engine.

A great number of connecting rod systems for radial engines have been proposed, the principal system now in use comprising a master rod embracing the crankpin of a crankshaft, said rod having articulated thereto a plurality of subsidiary rods. In such a system, the master rod has true motion, but the subsidiary rods, due to their angulation with respect to the master rod, do not have true motion, and the pistons carried on the several auxiliary rods will have errors in displacement in accordance with the angular position of the crankshaft, making it impossible to completely balance the reciprocating parts with counterweights. Furthermore, valve and spark timing errors are introduced by the errors in piston positions. These errors result in roughness in engine operation and loss of optimum performance which becomes particularly objectionable in large displacement, high power output engines. Many attempts have been made to alleviate this difficulty, some of which comprise the use of slipper type rods where all of the rods will have true motion and will move about the crankpin center. Such systems, particularly when the number of engine cylinders is seven or nine, restrict the bearing area of the rods and involve considerable difficulty in fabrication. Still another system has been proposed wherein all connecting rods are articulated to a spool member embracing the crankpin, and means are provided to prevent rotation of the spool so that each connecting rod will have the same path of motion during rotation of the crankpin. It is with the latter class of rod systems that this invention is more or less associated, but the added complication of mechanism necessary to hold the spool from rotation is wholly eliminated.

The details of the invention may be better understood by a reading of the annexed specification in connection with the drawings, in which similar numbers indicate similar parts, and in which:

Fig. 1 is an end view of a nine cylinder radial rod system applied to the crankpin of a shaft;

Fig. 2 is a side elevation of a crankshaft showing a portion of the rod system in section;

Fig. 3 is a section on the line 3—3 of Fig. 2;

Fig. 4 is a graph showing clearances with respect to crank angle; and

Fig. 5 is a fragmentary elevation of an alternative form of abutment device.

Referring to the drawings, the letters $a$ to $i$, inclusive, designate the axes of the cylinders of a nine cylinder radial engine, all of these axes intersecting at the axis of a crankshaft member 10, provided with a crankcheek 11 and a crankpin 12. A crankpin bearing member 13 is in bearing engagement with the crankpin 12 through a bushing 14, and comprises a crankpin embracing portion 15 and flanges 16 and 17 extending therefrom. These flanges are pierced for the reception of pins 18 upon which are journaled a plurality of identical rods 19, the rods being designated by letters corresponding to their cylinders, the pins 18 permitting of free oscillation of the several rods with respect to the bearing member 13 and with respect to each other.

In order to define the limits of oscillation of the rods with respect to the member 13, each rod is provided, outward of the pin 18, with pairs of oppositely facing abutments 20 and 21 which are adapted to cooperate with fingers 22 extending radially outward from the flanges 16 and 17 of the member 13, each of these fingers having an abutment 23 which may be engaged by the abutment 20, and having an abutment 24 which may be engaged by the abutment 21. The several abutments and fingers 20–24 are designated by letters corresponding to the rods and cylinders with which they are related.

The included angle between the abutments 23 and 24 is manufactured so that, when one rod has its piston at the top center position in its cylinder, the abutments on the two rods in the cylinders whose axes are nearest to 90° from the aforementioned cylinder, are each substantially in contact with their respective fingers 22 on the bearing member. This is indicated in Fig. 1, where the rod 19h for cylinder h is shown with its abutment 21h in contact with the finger abutment 24h, and the rod for cylinder c is shown with its abutment 20c in contact with the finger abutment 23c, where the rod in cylinder a is at its top center position.

Assuming the rod 19a to be in top dead center position as shown, the abutments 24h and 23c which coact with the rods 19h and 19c respectively are disposed angularly to contact the rod abutments 21h and 20c, thus holding the bearing member 13 from rotation and disposing the rod 19a on a radius of the crankpin. The other fingers 22 with their abutments are similarly disposed with respect to their associated rods 19.

Now, the maximum angularity for any rod occurs when the crankpin is disposed at 90° to the axis of its cylinder. The cylinders of a nine cylinder engine are 40° apart and cylinders c and h make 80° angles with the cylinder a. Thus, if counter-clockwise rotation is assumed in Fig. 1, the rod 19c has gone past its position of maximum angularity by 10°, and the rod 19h is ahead of its position of maximum angularity by 10°. However, as the crankpin 12 moves through its next 10° from the position shown, the abutments 20c and 23c will separate to provide clearance at a greater rate than the abutments 21h and 24h tend to reduce the clearance, so that, at the 10° point, there will be a slight looseness of the member 13, permitting free oscillation thereof between abutments 23c and 24h except for the fact that the forces imposed on the system will tend to keep the abutments 21h–24h in contact. The member 13 will be turned clockwise slightly from its true motion orbit by the approach of the rod 19h to its maximum angularity position. After the 10° point, to the 20° point, the abutments 20d–23d will begin to approach each other to close up their clearance while the member 13 moves counter-clockwise due to its continued abutment with the rod 19h. The complete closing will occur at 20° past center, whereupon the rods 19d and 19h hold the member 13 in neutral position. Thereafter, for the next 10°, the abutments of rods 19d and 19h spread to increase the clearance to allow maximum clearance at the 30° point, and during the next 10° of crank rotation, the rods 19i and 19d close in to hold the member 13 from oscillation at the 40° point when the rod 19h is in its top dead center position.

Fig. 4 of the drawings graphically illustrates several cycles of bearing member freedom and constraint, the areas which are hatched being crank angle stations where clearance occurs, and the intermediate curve of sine-wave form representing the angular excursions of the bearing. The successive stages of activity of sets of abutments 20–23 and 21–24 are indicated with respect to those rods 19a to i which are currently active as master rods.

The successive functioning of the several abutments imparts to the member 13 a slight angular oscillation or vibration, the magnitude of which is very small. For instance, the total normal angular excursion of the member 13 is only .46° and the maximum clearance possible to permit freedom of the member 13 is only .020″ in a practical design for a nine cylinder rod system. This maximum freedom occurs twice between successive top center positions of the crankpin for adjacent cylinders, respectively at 10° and 30° of the 40° between said cylinders.

In the positions shown in Fig. 1, one of the two rods 19c and 19h will act as a master rod due to its abutment with the member 13 and thereby, certain bending moments will be imposed in that rod by virtue of the torsional moment induced in the member 13 by power impulses of that or those rods which are driving the crankpin. These bending moments, however, are of a sufficiently small magnitude so that the several connecting rods may be made in proportions which are useful and practical. One advantage flows from the use of all of the rods of the system as master rods at intervals in that piston side pressures resulting from bending moments on the rods and from other causes, are distributed to all cylinders rather than to only one cylinder as obtains in the case of the master connecting rod construction.

The angular displacement of the member 13 from a "true motion" orbital path as the crankpin rotates, will have, practically, an infinitely small effect in upsetting piston displacement relationships.

Another characteristic of the system is that those rods which are acting as master rods at any one time are not subject to power impulses from their respective cylinders—that is, those rods which are transmitting power impulses from their respective pistons to the crankpin, are substantially free of any bending stresses at that instant. The rods which are acting as master rods will be stressed in bending without the added stress due to power transmission from their respective pistons to the crankpin.

It appears presently that a system of this kind would be most applicable to an engine having a large number of cylinders—if only three or five cylinders were embodied in the engine, the free motion of the member 13 might become excessive. But with engines having seven, and more particularly nine cylinders, the free action of the member 13 is of such a small order as to make the system distinctly practical. However, if the bearing member is constrained to the sine wave orbit by forces of operation, the system may have equal utility in engines of other numbers of cylinders.

In the description above, it has been indicated that the angles of abutments 23 and 24 are such as to just permit of abutment of the connecting rods at certain times, without clearance at that time or without a jamming effect. However, in certain environments, it may be considered advisable to allow for clearance instead of positive contact of both rods with the bearing member, as indicated for rods 19c and 19h in Fig. 1. One consideration in this respect is the removal of the natural vibration frequency of the member 13 and associated parts from possible synchronism with the exciting impulses. It is also feasible to arrange the abutments 23 and 24 with negative clearance, whereby jamming would occur when said abutments engage their respective rods. Such jamming would cause deflections in the fingers 22 and in the connecting rods, which can be designed with sufficient flexibility to assume the enforced deflections without undue stress of the parts. Since the engine parts are subject to numerous strains in operation, and since the rods, pistons, cylinders, crankcase and crankshaft of the engine are all relatively slightly flexible, the total or partial jamming of the rods and bearing member, by omitting the clearance apparently needed by the geometry of the system, would impose no undue hardship nor prevent proper functioning of the engine components.

Fig. 5 shows an alternative form of resilient finger 22', wherein the finger is slotted or bifurcated as at 25 whereby the abutments 23' and 24' are mounted, in effect, on stiff springs. Such an arrangement or any equivalent one, would allow of positive contact of abutments 20–23 and 21–24 without relative clearance, and the slot 25 would be made of a width equivalent to the maximum geometrical clearance indicated in Fig. 4. Thereby, both elements of the bifurcated finger 22' would function as a relatively positive stop when the slot 25 is closed by deflection of one of the bifurcations.

In Fig. 4, the curve A represents the effective angular excursions of the member 13 as calculated for a system operating at a speed of about 2300 R. P. M., taking into consideration the masses, forces and movements of all parts of the system. It is apparent that the operating vibration amplitude is extremely small so that no harmful effects would be produced in the engine.

The effect of engine explosions on this sine wave of angular excursions is calculated to be a modification of the wave form equivalent to mathematical additions of the principal sinusoidal component of explosion torque variation, and, in consideration of a certain amount of flexibility in the rods and associated parts, a damping effect on torque vibration transmitted to the engine mounting structure, is expected with properly proportioned parts.

In Figs. 1 and 2 of the drawings, means 30 are shown to retain the pin 18 in the member 13, and to hold them from rotation, such means comprising a strip 31 overlying the end of the pin 18, having a lip 32 engaging part of the member 13 to hold it from rotation, and a nut lock 33 engaging the strip 31 and having a tab 34 for locking engagement with the head 35 of a screw 36 screwed into a suitable bore in the pin 18. The crankarm 11 is shown as being provided with a conventional counterweight 38. The system of abutments (20, 23, 21, 24) shown in the drawings illustrates only one of a number of practical forms of devices for limiting oscillation of the rods with respect to the bearing member, and it is not intended that the specific form of abutment means shown be construed as a limitation of the scope of the invention.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a radial cylinder engine having a crankpin, a bearing hub on said crankpin, a plurality of similar connecting rods for the cylinders articulated to said hub, and resilient abutments on said hub engageable sequentially by said rods and having negative clearance relative to those rods with which they engage, the abutments being so closely spaced relative to said rods as to enforce a series of advancing and retreating movements of the hub due to engagement of the rods with said abutments.

2. In a radial cylinder engine having a crankpin and an odd number of cylinders, a bearing hub on the crankpin, connecting rods articulated to said hub and engaging said cylinders, abutments on said hub so spaced as to positively engage both of those connecting rods of cylinders which are nearest to 90° away from that cylinder whose connecting rod is at top center position, and resilient means for cushioning the engagement of the rods with said abutments.

3. In a radial cylinder engine having a crankpin, a hub borne on the crankpin comprising axially spaced flanges integral with a bearing, a plurality of connecting rods having their inner ends disposed between and pivoted to said flanges, fingers extending substantially radially outward from said flanges between respective rod pivots, and fingers extending from each rod in a direction substantially parallel to the crankpin axis for abutting engagement with said flange fingers and so proportioned as to sequentially engage said flange fingers in abutting relationship.

4. In a radial cylinder engine having a crankpin, a hub borne on the crankpin comprising axially spaced flanges integral with a bearing, a plurality of connecting rods having their inner ends disposed between and pivoted to said flanges, fingers extending substantially radially outward from said flanges between respective rod pivots, and fingers extending from each rod in a direction substantially parallel to the crankpin axis for abutting engagement with said flange fingers and so proportioned as to sequentially engage said flange fingers in abutting relationship, the flange and rod fingers having resilient reaction with respect to one another in a circumferential direction to cushion the abutments of the rod fingers with the flange fingers.

5. In a connecting rod system for a radial cylinder internal combustion engine including a crankshaft having a crankpin, a bearing on the crankpin carrying circumferentially disposed knuckle pins, a connecting rod articulated on each knuckle pin, the several rods being adapted for relative angulation during crankpin rotation, abutments formed on said rods, and abutments formed on said bearing, between the knuckle pins, with which said rod abutments are engageable, the included angle between any substantially diametrically opposed pair of oppositely facing bearing abutments being greater than the minimum included angle between the rod abutments of corresponding rods to enforce pressure contact of the rod abutments with the bearing abutments when respective rods are in position for a minimum included angle, and resilient means incorporated in the abutments to absorb the enforced pressure contact to the elimination of fracture of the associated parts.

HENRY C. HILL.